United States Patent
Yellin

[15] 3,683,857
[45] Aug. 15, 1972

[54] FLOOR CAGE

[72] Inventor: Bernard Yellin, 5252 S. Kulmar Ave., Wilmette, Ill. 60091

[22] Filed: March 26, 1971

[21] Appl. No.: 128,539

Related U.S. Application Data

[63] Continuation of Ser. No. 807,371, March 14, 1969, abandoned.

[52] U.S. Cl. .................................................119/17
[51] Int. Cl. ..........................................A01k 31/00
[58] Field of Search .119/17; 108/150; 248/150, 152, 248/159

[56] References Cited

UNITED STATES PATENTS

| 199,115 | 1/1878 | Smith | 119/17 |
| 220,244 | 10/1879 | King | 119/17 |
| 222,877 | 12/1879 | Drayton | 119/17 |
| 2,864,335 | 12/1958 | Yellin | 119/17 |
| 3,230,909 | 1/1966 | Watson | 108/150 |

*Primary Examiner*—Hugh R. Chamblee

[57] ABSTRACT

A floor cage which includes a stand for the cage formed of a pair of base members of generally similar shape and of a hollow construction and molded of a plastic material, each having a horizontal end wall, with the base members when in assembled relation positioned so that one member is inverted with respect to the other, with the end walls adjacent each other and with the two base members connected together by fastening elements, with the inverted base member forming the upper part of the stand to receive and support a collapsible cage body and the other base member forming the lower part of the stand.

5 Claims, 5 Drawing Figures

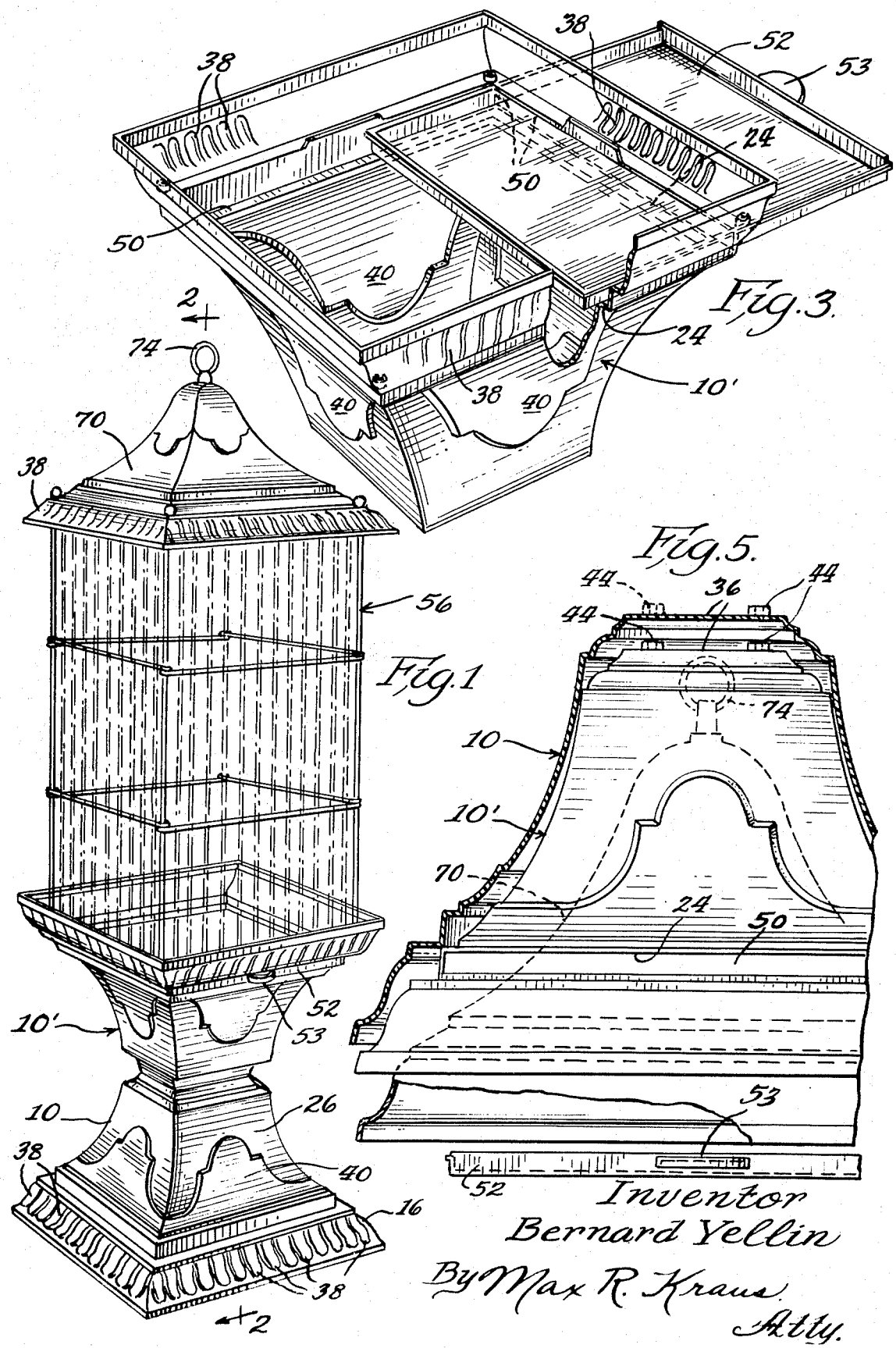

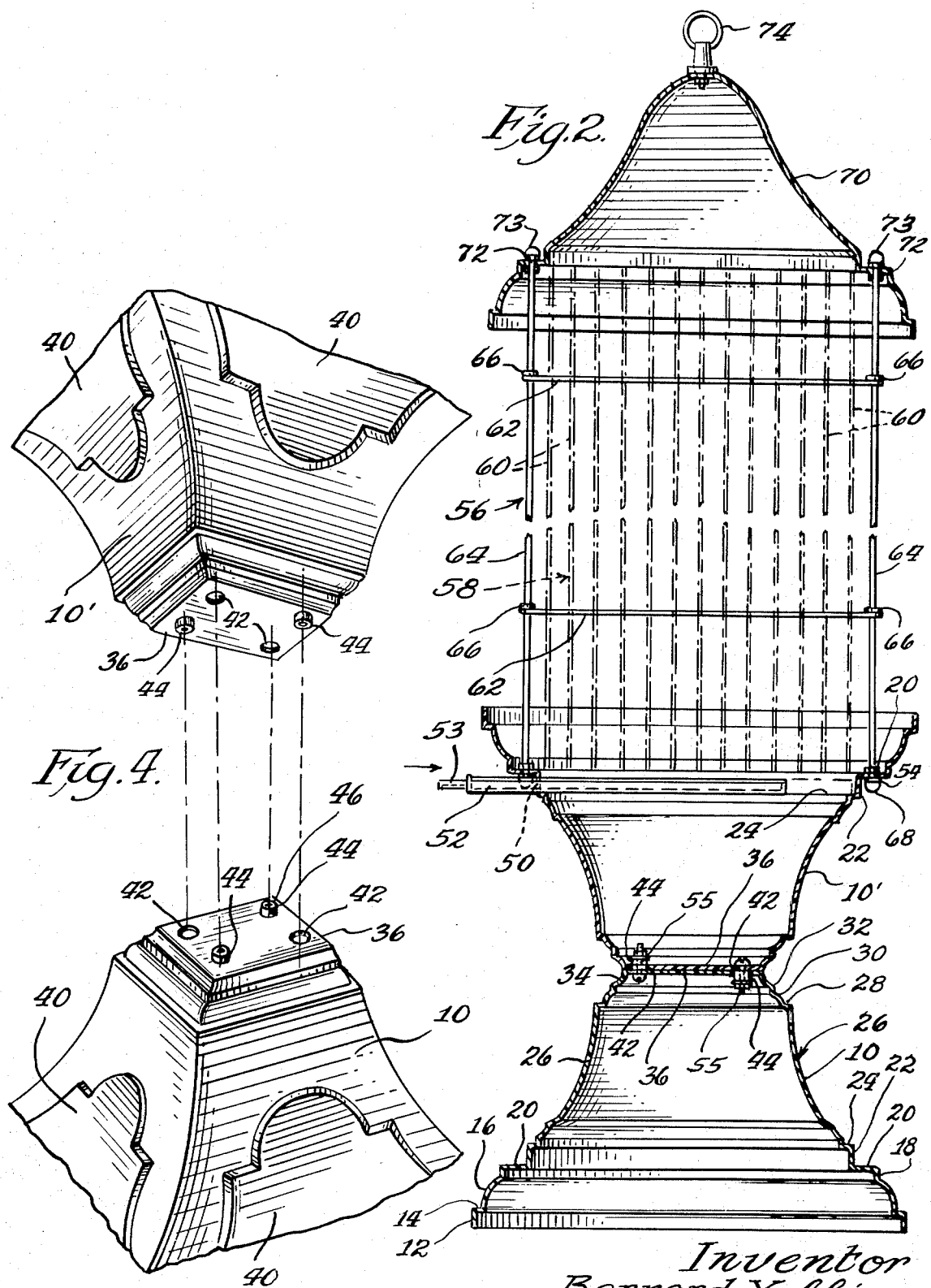

FLOOR CAGE

This application is continuation of application Ser. No. 807,371, filed Mar. 14, 1969, now abandoned.

BRIEF SUMMARY OF THE INVENTION

One of the objects of this invention is to provide a floor cage for birds and the like in which the floor stand to which the cage is secured is formed of a pair of members of identical shape and design and which are joined together at the point of assembly, one inverted with respect to the other, and in which the cage body is collapsible and which may be readily attached to the inverted base member. The base members are molded of a plastic material from a single die, thus providing economies in manufacturing. Also, the base members when shipped and/or stored may be positioned one within the other in a nested position thus reducing the overall height. The cage has sides which are hinged or pivoted so that the sides may be collapsed to reduce the overall dimensions of the cage when in shipping or storage condition. The parts are so constructed that they may be readily assembled and secured together in a relatively short time. Economies are effected in both the manufacture and in the shipping, which permits the use of cartons of reduced size.

BRIEF DESCRIPTION OF THE DRAWINGS

In the drawings:

FIG. 1 is a perspective view of the floor cage constructed in accordance with this invention.

FIG. 2 is a view partly in section taken on line 2—2 of FIG. 1.

FIG. 3 is a view of one of the base members forming the upper part of the stand, with the tray partially retracted.

FIG. 4 is an exploded perspective view of the two base members, and

FIG. 5 is a view partly in section showing the nesting of the two base members, as well as the nesting of the hood of the bird cage in the manner in which same would be shipped or stored to occupy a minimum of space.

DESCRIPTION OF THE PREFERRED EMBODIMENTS

The stand or base is formed of a pair of base members generally indicated by the numerals 10 and 10', both of which are identical in shape and construction and are molded of a plastic material. Since both base members are identically shaped and constructed, only one die mold is necessary for molding said members. Only one base member will be described in detail but the identifying numbers having reference to base member 10 will be equally applicable to base member 10'.

The base members 10 and 10' are each of a generally truncated pyramid shape and are hollow. The base member has a short bottom vertical wall section 12 of square shape in plan, which continues inwardly horizontally to form section 14, then curves upwardly to form section 16, then continues vertically upward to form section 18, then horizontally inward to form section 20, then vertically upward to form section 22, then horizontally inward to form section 24, then upwardly and curved inwardly to form section 26, then horizontally inward to form section 28, then upwardly and inwardly to form section 30, then upward vertically to form section 32, then upwardly and inwardly to form section 34, and terminates at the top in a horizontal end wall 36. The end wall 36 is square in plan. This arrangement provides a base member which is stepped from the bottom upwardly with the largest dimensions at the bottom and the smallest at the top.

The interior of the base members are hollow and the bottom is open. From the bottom upward there is a reduction of the area of each of the various stepped sections of the base member. This gives it a generally truncated pyramidal shape. Each base member has four sides. Each of the base members may be ornamented as by forming a design or configuration in the die so that same is molded in the finished section; for example, the section 16 is provided with surface molded ornamentation 38, and the section 26 has a surface molded ornamentation 40.

The end wall 36 is formed with two spaced openings 42 diagonally positioned adjacent the corners and with two annular bosses or projections 44 diagonally positioned adjacent the other corners. The bosses 44 have smaller openings 46 which extend through the end wall 36. When the two base members are positioned to form the stand, as shown in FIGS. 1 and 2, the base member 10' is inverted and the end wall 36 is positioned to engage base member 10 and the bosses 46 of one base member will fit into the openings 42 of the other base member to prevent relative movement therebetween. The two base members are secured to each other by fastening elements such as bolts and nuts.

As best seen in FIGS. 2 and 3, the base member 10', which is the base member that is secured in inverted position, has an elongated opening 50 which extends along the length of one of the four vertical sections 22, which permits the insertion into the base member 10 of a tray 52 which will rest on the horizontal wall section 24. The tray forms the bottom of the bird cage and the tray may be readily removed for cleaning by sliding it outwardly through engagement of the handle 53 on the front of the tray. While both base members are molded in the same mold, the elongated opening 50 in the base member 10 may be blocked out in the molding process so that no opening like 50 will appear in the bottom base member 10 and will only appear in the base member 10'.

The horizontal section 20 in base member 10' has an opening 54 at each of the corners thereof. These openings are blocked out in the molding of base member 10. Both base members forming the stand may be shipped or stored so that one substantially nests within the other, as shown in FIG. 5, and thereby occupies a minimum amount of space. In addition, the hood of the cage member can also be nested inside the inner positioned base member. In such nested position the overall height of the nested base members 10 and 10' and the nested hood is slightly greater than the overall height of one of the base members.

When the base members are to be secured together to form a stand, one of the base members, for example, base member 10' is inverted with respect to base member 10 so that the end walls 36 are positioned adjacent each other, with the bosses 46 in the end walls interfitting with the openings 42 in the adjacent end wall. Threaded screws or bolts 55 are passed through the openings and nuts are applied to join the two base members together, the upper base member 10' being joined in an inverted position relative to the lower base portion 10.

The cage body generally designated by the numeral 56 is formed of four sections 58. Each of the sections is formed of spaced vertically extending bars or wires 60 connected by cross bars or wires 62. Each section is formed as a separate integral unit. Two opposite sections 58 of the four sections each have at the opposite ends thereof a vertical end rod 64 which is longer than the height of the section so that the end rods extend above and below the top and bottom horizontal planes of the section. The opposite ends of each of the vertical end rods are threaded. There are four such rods, one at each of the corners of the cage body.

The cross wires 62 of each of the sections have their opposite ends looped around as at 66 to the vertical rods 64 whereby the four sections 58 are pivotally or hingedly joined together and this permits the cage body to be collapsed, that is, positioned where the sides are adjacent each other and close together so that the cage body occupies a minimum of space when in such collapsed condition. The cage body has open ends at the top and bottom thereof. When it is desired to set up the cage body on the upper base member 10', the cage body is positioned partially inside the upper base member 10' to rest on the horizontal section 20, with the extensions of the rods 64 passing through the openings 54. A nut 68 is secured to the threaded rod extensions to secure the cage body to said upper base member in an open or expanded condition, as shown in FIG. 1.

A hood or covering 70 for the upper open end of the cage body is formed of plastic material and same is provided with four openings 72 positioned at the corners thereof. The upper threaded ends of the rods 64 of the cage body pass through the openings 72 and fastening nuts 73 are secured thereto to hold the hood secured to the top of the cage body. The cage body is provided with a conventional door for entrance thereto. A ring 74 is secured to the top of the hood 70.

It can be understood from the foregoing that the entire unit can be shipped and stored in a knocked-down condition in which the two base members 10 and 10' are nested within each other, as is the hood 70. The cage body 56 which is collapsible can be contained therein. The assembly of this unit takes a relatively short time.

I claim:

1. A bird cage comprising, a stand formed of a pair of base members each integrally molded of plastic material and of identical shape and size so that same may be formed from the same die, said base members each having four side walls and provided with a plurality of sections which are stepped from the bottom upwardly with the largest diameter at the bottom and the smallest at the top, said sections defining a plurality of vertical and horizontal wall surfaces, each base member having a horizontal end wall providing a truncated pyramid shape for said base members, said base members capable of being nested one within the other for shipment and storage to occupy the space substantially of one of the members, said base members when assembled being positioned so that one member is inverted with respect to the other and the end wall of one is adjacent the end wall of the other, with one of said members forming the upper part of the stand and the other member forming the lower part of the stand, means for securing said base members together, and a bird cage body positioned to rest on one of said horizontal wall surfaces of said upper base member inwardly of the outer end of said upper base member, said cage body being collapsible and having vertical end rods which extend into openings on one of said horizontal wall surfaces on which the cage body rests, and locking members secured to said rods to retain said cage body on said base member.

2. A structure as defined in claim 1 in which the upper base member supports a tray which is removably supported on said upper base member, said tray forming the bottom for the cage body.

3. A structure as defined in claim 1 in which the upper base member has an elongated opening formed in one of the walls thereof through which a tray is inserted into the upper base member, which tray forms the bottom of the cage body.

4. A structure as defined in claim 1 in which each of the horizontal end walls is provided with a projection and an opening spaced therefrom so that when the base members are assembled and one base member is inverted with respect to the other, the projection of one base member will be received in the opening of the other.

5. A structure as defined in claim 3 in which each of the horizontal end walls is provided with a projection and an opening spaced therefrom so that when the base members are assembled and one base member is inverted with respect to the other, the projection of one base member will be received in the opening of the other.

* * * * *